United States Patent Office 2,947,499
Patented Aug. 2, 1960

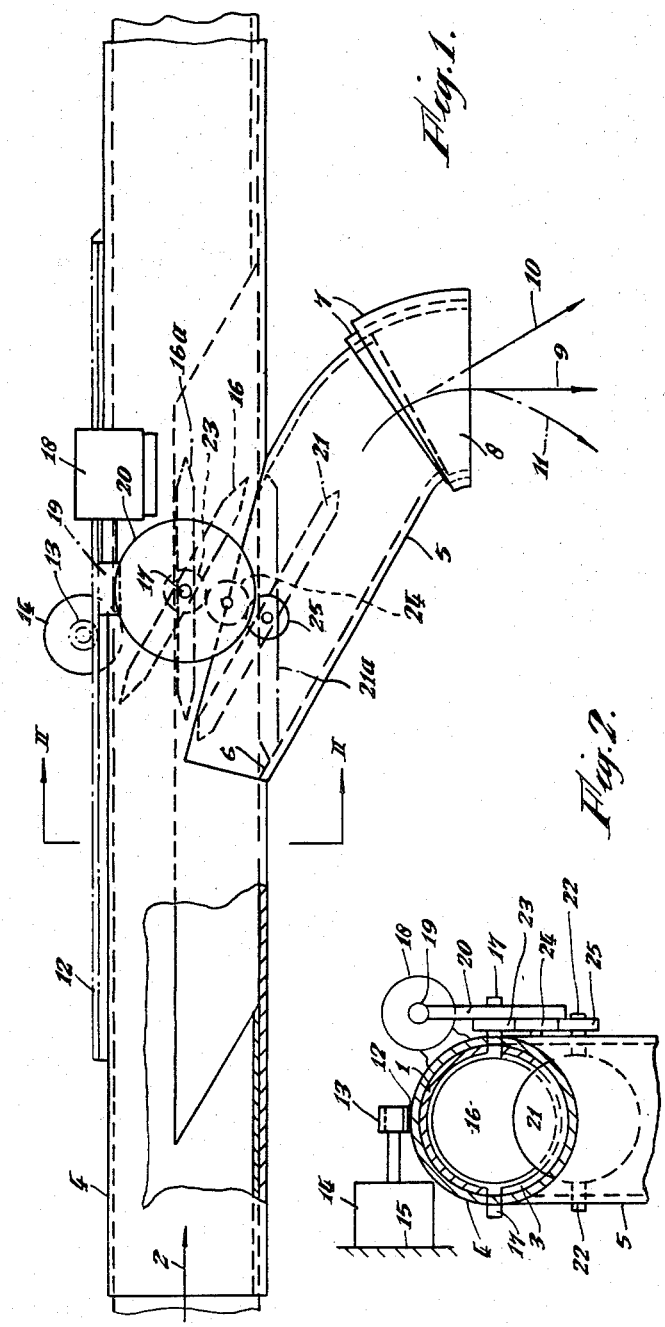

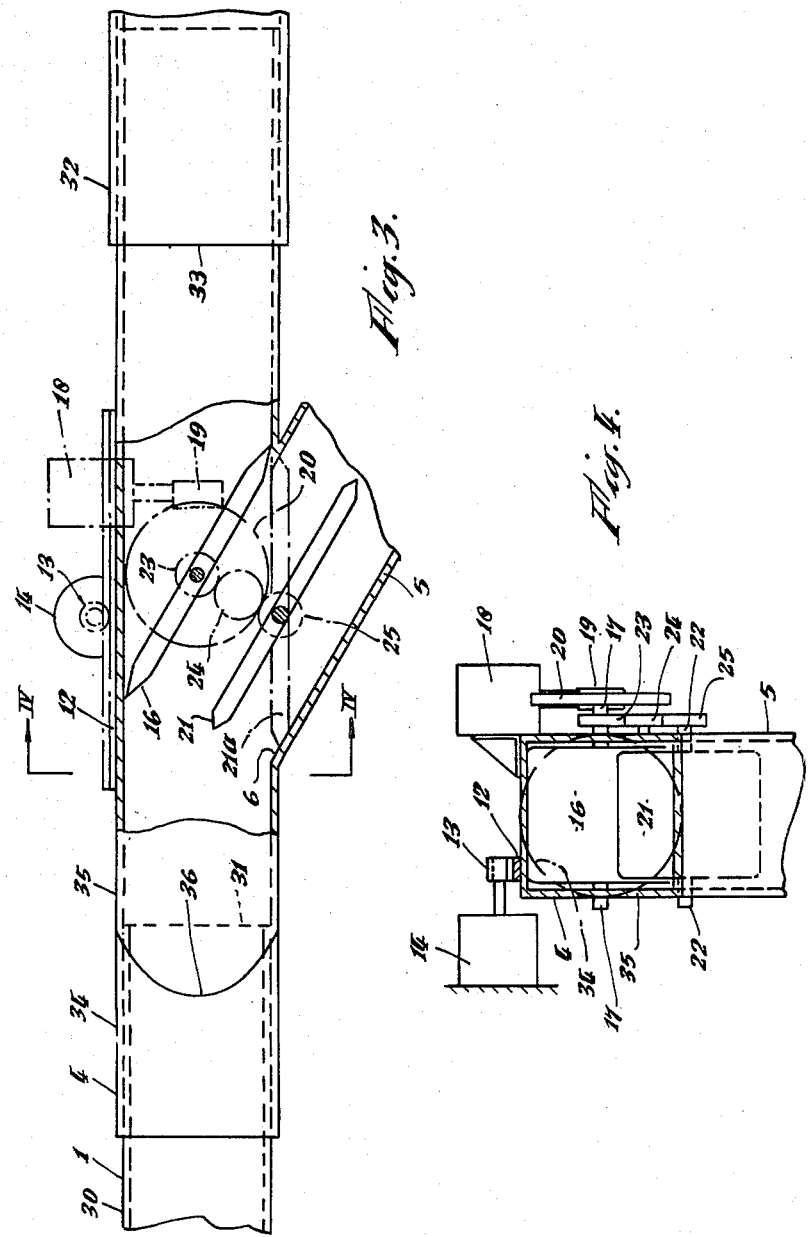

2,947,499

JET PROPULSION FOR AIRCRAFT AND CONTROL MEANS THEREFOR

Aubrey Douglas, Saltford Farm, Saltford, Somerset, England

Filed Sept. 27, 1955, Ser. No. 536,883

Claims priority, application Great Britain Oct. 2, 1954

8 Claims. (Cl. 244—23)

This invention relates to aircraft having means for propulsion or control by the reaction of an emitting gas stream. Such means may comprise a reaction propulsion engine having a jet tube directed for driving or lifting the aircraft or may comprise a jet tube through which passes air from a compressor ar exhaust gases from an engine and directed for the control or manoeuvre of the aircraft.

It is known to divert the gases passing through a jet tube from one direction to another, the other direction extending at an angle to the first direction or running parallel thereto in the opposite sense, whereby to change the direction of the reaction of the emitting gas stream. Often, however, such a change of direction has as a consequence that the new reaction unfavourably affects the balance of the aircraft because it does not pass through a determined point, say the centre of lift or the centre of gravity, on the aircraft. This comes about because the apparatus which it is desirable to use for such purposes makes it difficult to maintain the position, as distinct from the direction, of the emitting gas stream uniformly with respect to said determined point when the gas stream is diverted to its second direction. The object of this invention is to overcome this difficulty.

The invention applies equally to cases where the second direction of the gas stream is fixed and to cases where this second direction is variable.

According to this invention I provide in aircraft having means for propulsion or control by the reaction of an emitting gas stream, apparatus for diverting the gas stream from a first direction of flow into a second direction, and means for varying the position of the stream so diverted relative to a fixed point on the aircraft.

Various forms of apparatus according to this invention will now be described with reference to the accompanying drawings wherein:

Fig. 1 is a part-sectional elevation of a first form of the apparatus,

Fig. 2 is a section on the line II—II in Fig. 1,

Fig. 3 is a part-sectional elevation of a second form of the apparatus,

Fig. 4 is a section on the line IV—IV in Fig. 3,

Figure 5:
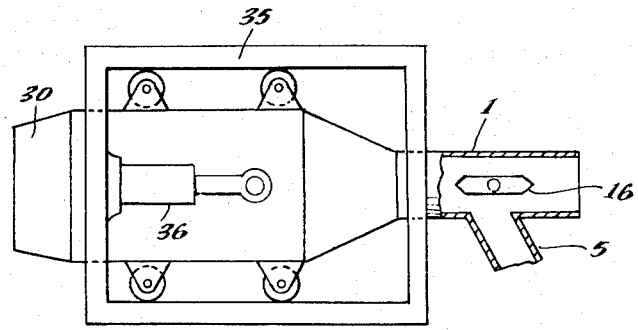
Fig. 5 is an elevation of a third form of the apparatus.

Referring to Figs. 1 and 2, there is shown a part of a round jet tube 1 as emanating rearwardly from a jet engine (not shown), the gases from the engine passing through the tube 1 in the direction of the arrow 2. The tube 1 is provided on its underside with a slot 3. A cylindrical sleeve 4 is seated co-axially on the exterior of the tube 1 and is constrained thereon for axial motion. The sleeve 4 is provided with a branch duct 5 having an inlet port 6 from the sleeve 4 and extending therefrom downwards and rearwards. At its lower end the duct 5 is provided with a plurality of arcuate tubular members 7 capable of telescopically contracting or expanding and thus forming at the end of the duct 5 an outlet passage 8 whose direction may be varied from the vertically downward position signified by the arrow 9 to a rearward and downward or forward and downward position as shown by the arrows 10 and 11 respectively. Operating means for the members 7 are not illustrated as the operation of these members does not form part of this invention, and it may be stated that any known means for changing the direction of the outlet from the duct 5 may be employed.

The sleeve 4 has secured thereto a rack 12 meshing with a pinion 13 adapted to be rotated by a rotary hydraulic motor 14 secured at 15 to a stationary part of the air frame in respect of which the apparatus is installed. Operation of the motor 14 causes the sleeve 4 to move axially on the tube 1, and the arrangement is such that during movement of the sleeve the inlet port 6 travels through positions between the ends of the slot 3.

In the interior of the sleeve 4 there is provided a baffle 16 secured to transverse horizontal trunnions 17 journalled in the sleeve 4 so that the baffle may be pivoted from the operative position shown to an inoperative position denoted 16a. The pivoting of the baffle 16 is effected by an electric motor 18 secured to the outside of the sleeve 4 and adapted to rotate one of the trunnions, constituting a driven trunnion, through a worm 19 and worm wheel 20. The baffle 16 is so situated in respect of the inlet port 6 that in its operative position the baffle 16 diverts the rearward flow of the gases from their normal course into the duct 5.

In the inlet port 6 there is provided a baffle 21 pivotally supported in the walls of the duct 5 by trunnions 22 extending parallel to the trunnions 17. One of the trunnions 22 is connected to the driven trunnion 17 by a train of three gear wheels 23, 24, 25 so that the baffle 21 is operated simultaneously with the baffle 16. The arrangement is such that the baffles 16, 21 always lie in substantially parallel planes and, when the baffle 16 is in its inoperative position 16a, the baffle 21 is in an inoperative position 21a during which it closes the inlet port 6, while in the operative position shown the baffle 21 assists in the diversion of the gas stream into the duct 5.

The drawing shows the sleeve 4 in a position intermediate between the ends of the amount of axial travel provided for, and the outlet passage 8 is shown as extending vertically downwards. The apparatus is so located relative to the aircraft that in this position the resulting vertically upwards jet reaction passes through the centre of lift of the aircraft. When, in operation, it is desired to direct the outlet downwards and rearwards in the direction of the arrow 10 to provide a lifting and driving reaction the resulting direction of thrust would tend to elevate the aircraft and, in order to avoid this, the sleeve 4 is moved rearwards to a position when the reaction will again pass through the centre of lift. When the outlet is to be directed forwards and downwards to provide a lifting and breaking reaction the sleeve 4 is moved correspondingly forwards.

It will be appreciated that the sleeve 4 may be moved in accordance with the varying conditions of flight as they effect the trim of the aircraft, and while the angle of the outlet passage 8 would normally have a fixed relation to the axial position of the sleeve 4, this need not necessarily be so.

Referring to Figs. 3 and 4, the form of apparatus shown therein is the same as that shown in Figs. 1 and 2 (and like reference numerals are used for like parts) except in the following respects.

The jet tube 1 comprises a front portion 30 which ends at 31 inside the sleeve 4 upstream of the port 6 and, axially spaced apart from the front portion 30, the jet tube 1 comprises a rear portion 32 commencing downstream of the port 6 at 33 and embracing the sleeve 4. The slot 3 is dispensed with. The sleeve 4 comprises a round end portion 34 joined at 36 to a square section main portion 35. The duct 5 and the members 7 (not shown in Fig. 3) are likewise of square cross section. The baffles 16, 21 have a rectangular shape suiting the cross section of the sleeve 4 and the duct 5. Downstream of the baffle 16 the sleeve 4 may continue in square cross section but preferably its cross section is again changed to round form where it enters the portions 32 of the jet tube 1, the latter portion being desirably of round cross section.

The advantage of this arrangement is that, having regard to the velocity and direction of the gases, there is little tendency for gases to escape through the joints between the jet tube 1 and the sleeve 4. Further the slot 3, which may give rise to uneven thermal expansion, may be dispensed with. The square cross section of part of the sleeve 4 and of the duct 5 favours the manufacture of the junction of these two members and the embodiment of the baffle 21. The square cross section of the duct 5 favours the construction of the members 7 or any other means for changing the direction of the outlet passage 8.

In a further form of the invention (Fig. 5) there is provided a reaction propulsion engine 30 having a jet tube 31 on which is provided an outlet or branch duct 5 and wherein there is provided a baffle 16 for diverting the gas into the outlet or branch duct 25. In other words the movable sleeve is wholly dispensed with. To move the position of the outlet or branch duct in this case the assembly of engine 30 and jet tube 1 assembly is mounted for movement in the air frame indicated at 35, means such as a reciprocating hydraulic motor 36 is provided to effect this movement.

Figure 6:
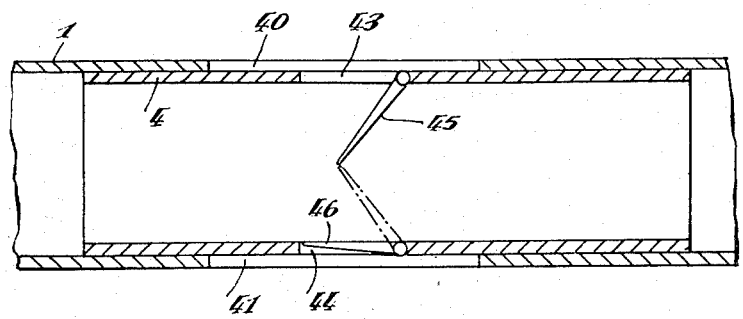
Fig. 6 is a longitudinal section of a fourth form of the apparatus.

In yet another modification (Fig. 6) there is provided a jet tube 1, a first longitudinal slot 40 in one side and a second longitudinal slot 41 in the opposite side of the tube 1, a slidable sleeve 4 or the like situated inside the tube 1 and containing two opposite ports 43, 44 registering with the respective slots 40, 41, and a first and a second baffle 45 and 46 respectively situated in the sleeve 4 and mounted for pivotal motion therein so that when the baffles are in the operative position the gases are diverted by the two baffles 45, 46 through the respective ports 43, 44. In this case the gases are divertible in two opposite streams from the main tube. Means may be provided to close the two ports 43, 44 selectively, so that if required the gases may be diverted through one side of the main tube 1 only.

What I claim and desire to secure by Letters Patent is:

1. An aircraft having means for propulsion or control by the reaction of a gas stream emitting from an exhaust tube, comprising a first exhaust tube for guiding the gas stream into a first direction, a second exhaust tube extending at an angle to said first direction, means for diverting at least a part of the gases from the first tube into the second tube, and means for moving the second tube in a direction parallel to said first tube to thereby define a means for varying the position of the gas stream emitted from the second tube in a direction parallel to said first direction.

2. An aircraft according to claim 1, wherein said means for diverting the gases from the first tube comprises at least one baffle pivotally mounted on said first exhaust tube.

3. An aircraft according to claim 1, wherein said first tube is formed in its wall with an aperture, said second tube is secured to an intermediate member covering said aperture and provided with an inlet opening to said second tube, said means for moving the second tube comprising means for moving the intermediate member along said first tube, and said aperture being dimensioned for said inlet opening to remain in registration therewith in at least a part of the range of movement of the intermediate member.

4. An aircraft according to claim 3, wherein said means for diverting the gases from the first tube comprises at least one baffle pivotally mounted on said intermediate member.

5. An aircraft having means for propulsion or control by the reaction of a gas stream emitting from an exhaust tube having an aperture in the wall of the exhaust tube, a member covering said aperture and having an opening positioned to register with the aperture, means for moving the member along the exhaust tube, the aperture being dimensioned for the opening to remain in registration therewith for at least a part of the range of movement of the member, and means for diverting at least a part of the gases from the exhaust tube through said opening in a direction forming an angle with the axis of the exhaust tube.

6. An aircraft having means for propulsion or control by the reaction of a gas stream emitting from an exhaust tube, comprising a tubular member telescopically slidable along the exhaust tube, an opening in the wall of the tubular member, means for diverting at least a part of the gases passing through the exhaust tube through said opening in a direction forming an angle with the axis of the exhaust tube, and means for moving the tubular member along the exhaust tube.

7. An aircraft having means for propulsion or control by the reaction of a gas stream emitting from an exhaust tube comprising an exhaust tube, means for diverting the exhaust gas from the exhaust tube into a direction froming an angle with the axis of the exhaust tube, and means for moving said last mentioned means relative to the aircraft in the direction of the axis of said exhaust tube.

8. An aircraft having means for propulsion or control by the reaction of a gas stream emitting from an exhaust tube, comprising a sleeve mounted in telescoping relation to said exhaust tube and positioned to receive the gases emitting therefrom, a member connected to the sleeve cooperating to divert the gases emitting from the exhaust tube through the sleeve into a direction at an angle to the axis of the exhaust tube, and means for moving the sleeve in the direction of the axis of the exhaust tube.

References Cited in the file of this patent

UNITED STATES PATENTS

| 1,471,764 | Wheeler | Oct. 23, 1923 |

FOREIGN PATENTS

| 643,969 | Great Britain | Oct. 4, 1950 |
| 730,585 | Great Britain | May 25, 1955 |
| 733,931 | Great Britain | July 20, 1955 |